US012445780B2

(12) United States Patent
Liu et al.

(10) Patent No.: US 12,445,780 B2
(45) Date of Patent: Oct. 14, 2025

(54) APPLICATION DEVICE

(71) Applicant: GOERTEK INC., Shandong (CN)

(72) Inventors: Chunfa Liu, Shandong (CN); Jianbin Yang, Shandong (CN); Jianxin Wang, Shandong (CN); Shousong Qiang, Shandong (CN)

(73) Assignee: GOERTEK INC., Weifang (CN)

( * ) Notice: Subject to any disclaimer, the term of this patent is extended or adjusted under 35 U.S.C. 154(b) by 357 days.

(21) Appl. No.: 17/999,880

(22) PCT Filed: Nov. 7, 2020

(86) PCT No.: PCT/CN2020/127328
§ 371 (c)(1),
(2) Date: Nov. 25, 2022

(87) PCT Pub. No.: WO2021/238075
PCT Pub. Date: Dec. 2, 2021

(65) Prior Publication Data

US 2023/0247365 A1 Aug. 3, 2023

(30) Foreign Application Priority Data

May 25, 2020 (CN) ......................... 202010458488.8

(51) Int. Cl.
*H04R 9/04* (2006.01)
*H04R 7/04* (2006.01)
(Continued)

(52) U.S. Cl.
CPC ............... *H04R 9/043* (2013.01); *H04R 7/04* (2013.01); *H04R 9/06* (2013.01); *H04R 9/025* (2013.01)

(58) Field of Classification Search
CPC ...... H04R 2400/11; H04R 7/18; H04R 9/025; H04R 1/06; H04R 9/043
See application file for complete search history.

(56) References Cited

U.S. PATENT DOCUMENTS

2010/0172535 A1* 7/2010 Huang ..................... H04R 7/20 381/404
2011/0243364 A1 10/2011 Walter
(Continued)

FOREIGN PATENT DOCUMENTS

CN 204090139 U 1/2015
CN 105472491 A 4/2016
(Continued)

OTHER PUBLICATIONS

International Search Report from International Application No. PCT/CN2020/127328 mailed Feb. 24, 2021.

*Primary Examiner* — Kile O Blair
(74) *Attorney, Agent, or Firm* — Shih IP Law Group, PLLC

(57) ABSTRACT

Disclosed is an application device, comprising a plurality of elastic members, each elastic member comprises a first connecting portion, a second connecting portion and a deformation portion therebetween, the first connecting portion and the second connecting portion are respectively connected to different members in the application device, and the different members are movable or fixed relative to each other, wherein the deformation portion is formed by extending from a first end to a second end in a straight line and/or a curve in the same direction or in different directions. According to the present disclosure, the manufacturing is simple and convenient, thinning of product is facilitated, and the elastic members maintain good compliance, without influencing the vibration of a vibration unit. At least one elastic member is widened and/or has at least two cross sections with different sizes, thereby reducing the stress concentration, and eliminating the resonance.

20 Claims, 7 Drawing Sheets

(51) Int. Cl.

| | |
|---|---|
| ***H04R 9/06*** | (2006.01) |
| *H04R 9/02* | (2006.01) |

(56) References Cited

U.S. PATENT DOCUMENTS

| | | | |
|---|---|---|---|
| 2013/0051597 | A1 | 2/2013 | Yeom |
| 2020/0053481 | A1 | 2/2020 | Ueno et al. |

FOREIGN PATENT DOCUMENTS

| | | | |
|---|---|---|---|
| CN | 206963062 | U | 2/2018 |
| CN | 207070345 | U | 3/2018 |
| CN | 108650598 | A | 10/2018 |
| CN | 109862484 | A | 6/2019 |
| CN | 110719554 | A | 1/2020 |

* cited by examiner

APPLICATION DEVICE

TECHNICAL FIELD

The present disclosure relates to the technical field of electro-acoustic, in particular to an application device.

BACKGROUND ART

An application device, such as a loudspeaker, as a transducer device that converts electrical signals into sound signals, is an important acoustic member in an electronic apparatus. Currently, with the continuous progress and innovation of technology, the structural design of traditional application devices is also constantly seeking for innovation and change. It not only needs to meet the development trend of thinning, but also pay more and more attention to the optimization of performance, and give consideration to the process simplification and cost control.

In the existing loudspeakers, a centering supporting sheet is fixed on a voice coil bobbin to prevent the voice coil from polarizing in a non-vibration direction during vibration, and the centering supporting sheet is generally in a sheet-shaped elastic wave shape. However, the manufacturing process of the centering supporting sheet in the sheet-shaped elastic wave shape is complicated, and the centering supporting sheet in the sheet-shaped elastic wave shape may increase the height of the loudspeaker in a vertical direction thereof, takes up more space and is not convenient to the thinning of the product. In the case of a large vibration displacement of the voice coil, the compliance of the centering supporting sheet in the sheet-shaped elastic wave shape becomes worse, and it cannot provide sufficient displacement, but may form a pull in a direction opposite to the voice coil displacement, affecting the vibration of the voice coil.

SUMMARY

A main object of the present disclosure is to provide an application device, which aims to solve the problem in the prior art that the centering supporting sheet affects the vibration of the voice coil.

To achieve the above object, the present disclosure provides an application device, the application device includes a plurality of elastic members, each of the elastic members comprises a first connecting portion, a second connecting portion, and a deformation portion between the first connecting portion and the second connecting portion, wherein the first connecting portion and the second connecting portion are respectively connected to different members in the application device, and the different members are movable relative to each other, or the different members are fixed relative to each other,

- wherein the deformation portion includes a first end connected to one of the first connecting portion and the second connecting portion, and a second end connected to the other one of the first connecting portion and the second connecting portion,
- wherein the deformation portion is formed by extending from the first end to the second end in a straight line and/or a curve in the same direction or in different directions, and
- wherein a cross-sectional size of at least one of the elastic members is larger than a cross-sectional size of remaining elastic member, and/or
- at least one of the elastic members has at least two cross sections having different sizes.

Preferably, in any one of the elastic members, an area close to the first connecting portion and the second connecting portion of the deformation portion form two widen areas correspondingly, an area of the deformation portion between the two widen areas forms a non-widen area, and a cross-sectional width of the deformation portion in the widen area is larger than a cross-sectional width of the deformation portion in the non-widen area.

Preferably, in each of the elastic members, the deformation portion has a planar structure, and the deformation portion, the first connecting portion and the second connecting portion are located in the same horizontal plane.

Preferably, all of the elastic members in each elastic member group are located in the same horizontal plane.

Preferably, the elastic members have wire-like bending structures.

Preferably, the deformation portion has an S-shaped bending structure formed by extending from the first end to the second end in a curve.

Preferably, a width of the deformation portion gradually increases in a direction from the first connecting portion to the second connecting portion, and extension lines of two sides of the deformation portion in a width direction intersect at a point in a direction in which the first connecting portion is far away from the second connecting portion, to form an acute angle, or

- wherein a width of the deformation portion gradually decreases in the direction from the first connecting portion to the second connecting portion, and the extension lines of the two sides of the deformation portion in the width direction intersect at a point in a direction in which the second connecting portion is far away from the first connecting portion, to form an acute angle.

Preferably, a bending line segment is formed by bending the deformation portion once, and ends of two adjacent bending line segments are connected by a circular arc segment, and line widths of the circular arc segment and two bending line segments connected to the circular arc segment are equal to each other or gradually change.

Preferably, line widths of the first connecting portion, the second connecting portion, the bending line segment and the circular arc segment close to the first connecting portion and the second connecting portion are larger than line widths of remaining bending line segments and remaining circular arc segments.

Preferably, a gap between the first connecting portion and a bending line segment adjacent to the first connecting portion, a gap between two adjacent bending line segments, a gap between the second connecting portion and a bending line segment adjacent to the second connecting portion and a diameter of the circular arc segment are greater than or equal to thickness of the elastic members.

Preferably, an opening is formed at a position between two adjacent bending line segments opposite to the circular arc segment, the opening located in the non-widen area is provided with a damping member, and the damping member connects two adjacent bending line segments.

Preferably, a central area is positioned between the first end and the second end; the deformation portion is formed by extending from the first end to the central area in a straight line and/or a curve in a first direction, then extending from the central area to the second end in a straight line and/or a curve in a direction opposite to the first direction.

Preferably, the deformation portion has a helical structure, and the deformation portion is formed by spirally extending from the first end to the central area in a clockwise direction or a counterclockwise direction, and spirally extending from the central area to the second end in the counterclockwise direction or the clockwise direction.

Preferably, a spiral line segment is formed by bending the deformation portion once, and two adjacent spiral line segments are arranged with an interval.

Preferably, line widths of the first connecting portion, the second connecting portion, and the spiral line segments close to the first connecting portion and the second connecting portion are larger than line widths of remaining spiral line segments.

Preferably, a gap between the first connecting portion and a spiral line segment adjacent to the first connecting portion, a gap between two adjacent spiral line segments, and a gap between the second connecting portion and a spiral line segment adjacent to the second connecting portion are greater than or equal to thickness of the elastic members.

Preferably, each of a gap between a spiral line segment connected to the first connecting portion and a spiral line segment adjacent thereto, and a gap between a spiral line segment connected to the second connecting portion and a spiral line segment adjacent thereto is provided with a damping member to connect two adjacent spiral line segments.

Preferably, the elastic members are made of any one of phosphor bronze, iron, steel or alloy materials.

Preferably, the application device further includes a vibration unit, and the elastic members are used to balance vibration of the vibration unit in a preset direction.

Preferably, one or more vibration units may be provided, and the vibration units may be arranged in a vertical direction or a horizontal direction.

Preferably, at least three elastic members are provided, and the at least three elastic members are uniformly spaced apart along a periphery of the vibration unit.

Preferably, two of the elastic members are conductors, and the remaining elastic member are non-conductor structures.

Preferably, the application device further includes a bracket, the vibration unit includes a diaphragm and a voice coil connected to the diaphragm; the first connecting portion is connected to the voice coil, and the second connecting portion is connected to the bracket, or the vibration unit includes a diaphragm, a voice coil and a cup, the voice coil and the cup are connected at the same side of the diaphragm, the first connecting portion is connected to the cup, and the second connecting portion is connected to the bracket, and/or the bracket is a housing or a magnetic yoke.

According to the present disclosure, the elastic member may be a wire-like, strip-like or sheet-like structure formed by integral punching from a metal sheet, may be a wire-like structure formed by winding a single metal wire, or may be a wire-like structure formed by winding two metal wires, thus it is simple and convenient in manufacture, have a simplified manufacturing process, have high manufacturing efficiency and reduced manufacturing cost. In addition, the elastic members may not increase the height of the application device in the vertical direction, takes up less space and is convenient to the thinning of the product. The deformation portion in the elastic member extends in a straight line and/or a curve in the same direction or different directions with a narrow and long structure, which can reduce the stress concentration of the deformation portion, increase the fatigue strength, and reduce the risk of fracture of the elastic member, so that during the vertical displacement of the elastic members following the vibration unit, the elastic deformation of the deformation portion is large enough, such that even when the vibration unit has a large vibration displacement, the compliance of the elastic member maintains good, thereby providing sufficient displacement without affecting the vibration of the vibration unit, and optimizing the product performance.

Meanwhile, at least one elastic member is widened so that the cross-sectional width thereof is larger than those of other elastic members, thereby reducing the stress concentration on the elastic member, avoiding breakage, ensuring the normal use of the elastic member and thus ensuring the normal use of the application device. In addition, at least one elastic member in the elastic member group is widened so that the overall vibration frequency of the elastic members can be changed so as to eliminate resonance and optimize product performance And/or, in the elastic member group, at least one elastic member has two cross-sections of different sizes, that is, any one of the elastic members may be provided with variable diameters, and specifically, in any one of the elastic members, an area with large stress can be widened locally, so that the cross-sectional size of the area with large stress becomes larger, reducing stress concentration in the area, avoiding breakage, and eliminating resonance.

BRIEF DESCRIPTION OF THE DRAWINGS

In order to explain the technical solutions in the embodiments of the present disclosure or in the prior art more clearly, the following description will briefly introduce the accompanying drawings required for the description of the embodiments or the prior art. Obviously, the drawings in the following description are merely some embodiments of the present disclosure, and for those skilled in the art, other drawings can also be obtained according to these drawings without any creative effort.

Figure 1:
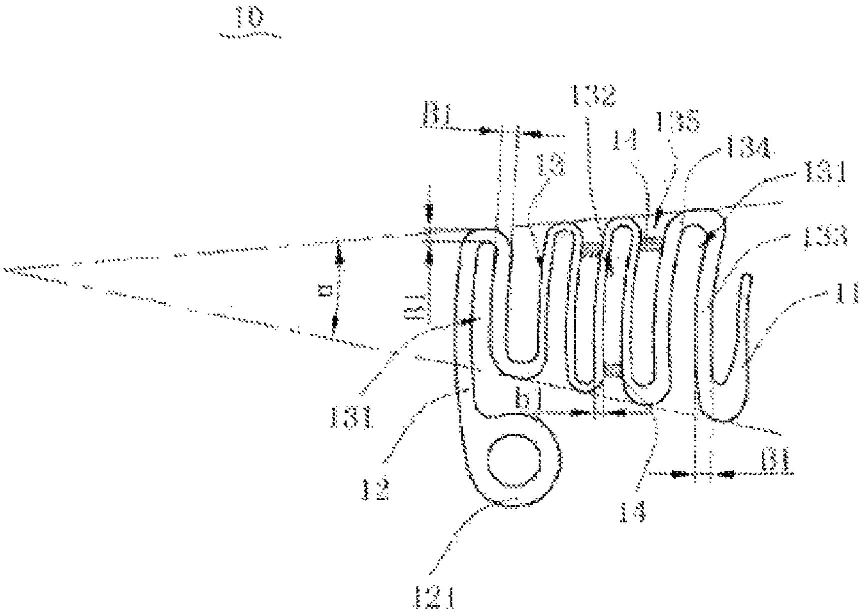
FIG. 1 is a schematic top view of an elastic member of an application device according to an embodiment of the present disclosure.

Reference signs:

| Reference signs | Name | Reference signs | Name |
|---|---|---|---|
| 10 | elastic member | 14 | damping member |
| 11 | first connecting portion | 20 | voice coil |
| 12 | second connecting portion | 21 | bobbin |
| 121 | hook portion | 22 | voice coil wire |
| 13 | deformation portion | 30 | elastic member group |
| 131 | widen area | 40 | vibration unit |
| 132 | non-widen area | 50 | magnetic circuit system |
| 133 | bending line segment | 51 | magnetic gap |
| 134 | circular arc segment | 60 | diaphragm |
| 135 | opening | 70 | bracket |
| 136 | spiral line segment | 80 | cup |
| 137 | central area | 100 | application device |

The realization, functional characteristics and advantages of the present disclosure will be further described with reference to the accompanying drawings in combination with the embodiments.

DETAILED DESCRIPTION OF THE EMBODIMENTS

The technical solutions in the embodiments of the present disclosure will be clearly and completely described below with reference to the drawings in the embodiments of the present disclosure. Obviously, the described embodiments are only part of the embodiments of the present disclosure, rather than all the embodiments. Based on the embodiments in the present disclosure, all other embodiments obtained by persons of ordinary skill in the art without creative efforts shall fall within the protection scope of the present disclosure.

It should be noted that all directional indications (such as up, down, left, right, front, back, etc.) in the embodiments of the present disclosure are only used to explain the relative position relationship, motion, etc. between members in a specific view position (as shown in the figure), and if the specific view position changes, the directional indication will change accordingly.

In addition, descriptions such as "first", "second", etc. in the present disclosure are only for descriptive purposes, and should not be construed as indicating or implying their relative importance or implicitly indicating the number of indicated technical features. Thus, features defined with "first" and "second" may explicitly or implicitly include at least one such feature. In addition, the technical solutions of various embodiments of the present disclosure can be combined with each other, but the combination must be based on the realization by those of ordinary skill in the art. When the combination of technical solutions is contradictory or impossible, it should be considered that the combination of such technical solutions does not exist, nor is it within the scope of protection claimed by the present disclosure.

The present disclosure provides an application device.

As illustrated in FIGS. 1-7, in the embodiment, the application device 100 includes a plurality of elastic members 10, each elastic member 10 includes a first connecting portion 11, a second connecting portion 12, and a deformation portion 13 between the first connecting portion 11 and the second connecting portion 12, wherein the first connecting portion 11 and the second connecting portion 12 are respectively connected to different members in the application device 100, and the different members are movable relative to each other, or the different members are fixed relative to each other; the deformation portion 13 includes a first end connected to one of the first connecting portion 11 and the second connecting portion 12, and a second end connected to the other one of the first connecting portion 11 and the second connecting portion 12; the deformation portion 13 is formed by extending from the first end to the second end in a straight line and/or a curve in the same direction or in different directions; a cross-sectional size of at least one of the elastic members 10 is larger than a cross-sectional size of remaining elastic member 10; and/or at least one of the elastic members 10 has at least two cross sections having different sizes.

Specifically, the elastic member 10 may have a wire-like, narrow strip-like or sheet-like structure formed by integral punching from a metal sheet, may have a wire-like structure formed by winding a single metal wire, or may have a wire-like structure formed by winding two metal wires. The deformation portion 13 has an S-shaped bending structure formed by extending from the first end to the second end in a curve; or a central area 137 is positioned between the first end and the second end, the deformation portion 13 is formed by extending from the first end to the central area 137 in a straight line and/or a curve in a first direction, then extending from the central area 137 to the second end in a straight line and/or a curve in a direction opposite to the first direction. The first direction may be a clockwise direction, and the deformation portion 13 may have a polygonal spiral structure, specifically a structure of quadrilateral, pentagon, hexagon, etc., or a structure of circular or elliptical, or a structure combined with straight line and curve shape. For example, a bending line segment 133 is formed by bending the deformation portion 13 once, a portion of the bending line segment 133 is in a straight line, and the other portion thereof is in a curve, specifically, the bending line segment 133 may have a shape in which a curve and a straight line are alternately connected. It should be noted that the alternation here is not limited to an alternation of one by one, but may also be an alternation of one by many and many by many.

The elastic member 10 is formed by bending and extending in a narrow and long structure as a whole, wherein the deformation portion 13 has a helical structure and is formed by spirally extending from the first end to the central area 137 in a clockwise direction, then spirally extending from the central area 137 to the second end in a counterclockwise direction. The deformation portion 13 may also have a square helical-like structure and is formed by extending from the first end to the central area 137 along a straight line and a curve respectively, then extending from the central area 137 to the second end along a curve and a straight line respectively. The deformation portion 13 may also have other structures formed by bending and extending in a narrow and long structure, the structure of the deformation portion 13 can be set according to actual use requirements. According to the present disclosure, the structure of the deformation portion 13 of the elastic member 10 in the application device 100 is not limited.

Figure 10:
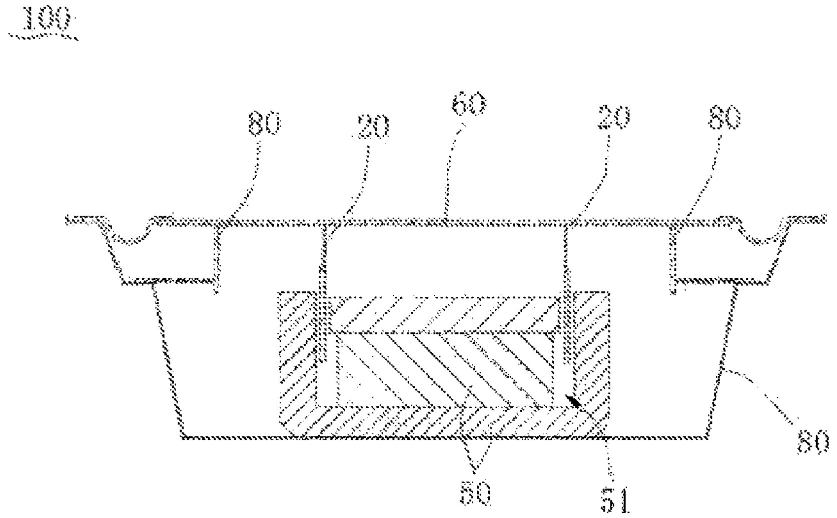
FIG. 10 is a schematic cross-sectional view of the application device according to an embodiment of the present disclosure.

As illustrated in FIG. 10, in the embodiment, the elastic member 10 may be applied to an application device 100 such as a loudspeaker, a motor or a multifunctional vibration device. The present embodiment will be described by taking the elastic member 10 applied to a loudspeaker as an example. The loudspeaker includes an elastic member 10 and a vibration unit 40, and the elastic member 10 is used to balance the vibration of the vibration unit 40 in a preset direction. The loudspeaker also includes a bracket 70. In an embodiment, the vibration unit 40 includes a diaphragm 60 and a voice coil 20 connected to the diaphragm 60; the first connecting portion 11 of the elastic member 10 is connected to the voice coil 20, and the second connecting portion 12 is connected to the bracket 70, and/or, the bracket 70 is a housing or a magnetic yoke. In another embodiment, the vibration unit 40 includes a diaphragm 60, a voice coil 20 and a cup 80, the voice coil 20 and the cup 80 are connected at the same side of the diaphragm 60, the first connecting portion 11 is connected to the cup 80, and the second connecting portion 12 is connected to the bracket 70, and/or, the bracket 70 is a housing or a magnetic yoke.

Figure 3:
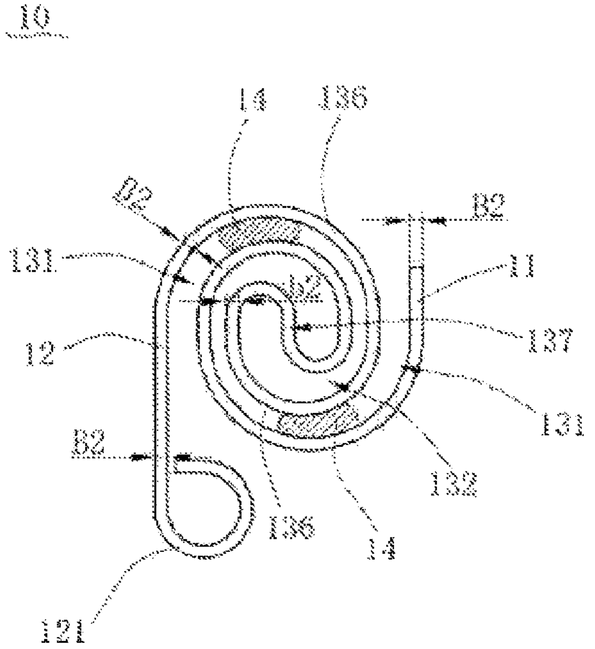
FIG. 3 is a schematic top view of an elastic member of an application device according to another embodiment of the present disclosure.
Figure 4:
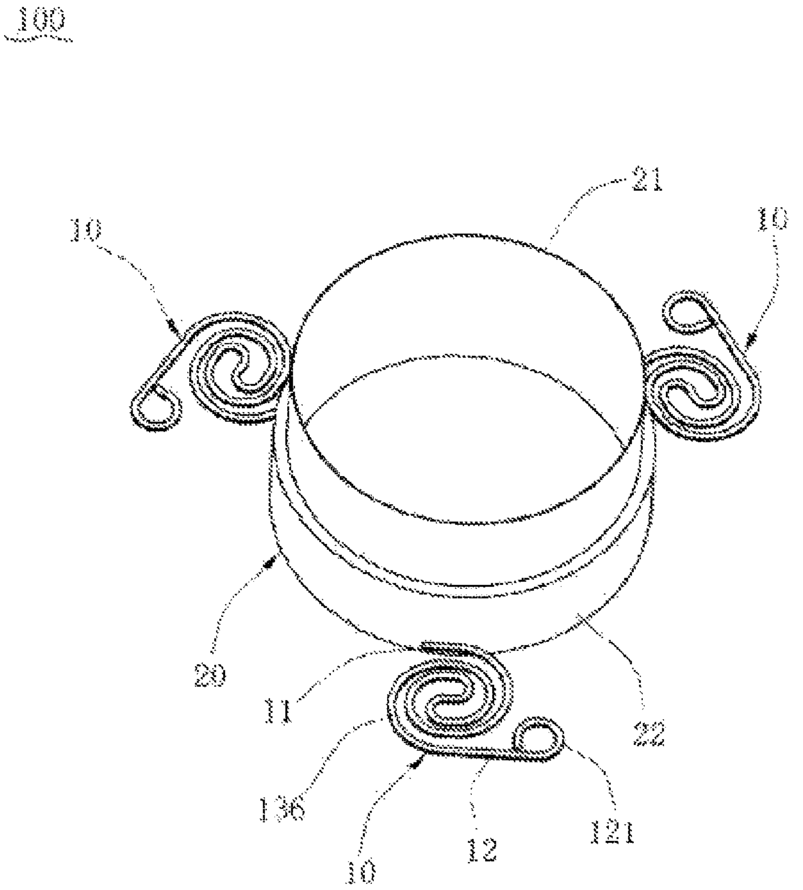
FIG. 4 is a schematic perspective view of a voice coil and an elastic member in an application device according to an embodiment of the present disclosure.
Figure 5:
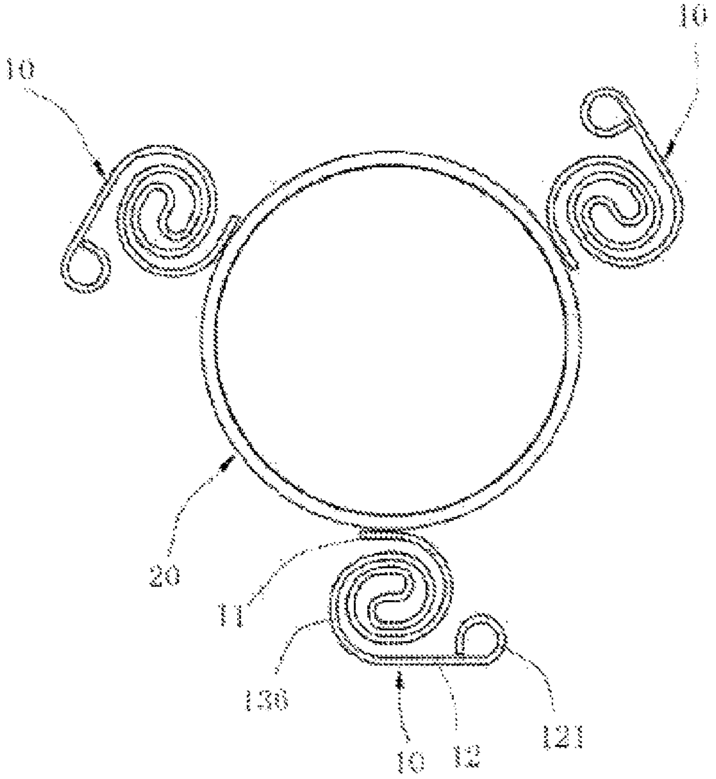
FIG. 5 is a schematic top view of the voice coil and the elastic member in the application device according to an embodiment of the present disclosure.

It will be understood that a plurality of elastic members 10 of the application device 100 are arranged at intervals along a periphery of the vibration unit 40. After being applied with the electrical signal, the vibration unit 40 may vibrate in an up-down direction (as shown in FIG. 3) in the housing. The vibration direction of the vibration unit 40 is indicated by vertical direction or up-down direction, and the direction perpendicular to the vibration direction of the vibration unit 40 is indicated by horizontal direction. As illustrated in FIG. 4, in an embodiment, the first connecting portion 11 of the elastic member 10 is connected to the voice coil 20. Specifically, the voice coil 20 includes a bobbin 21 and a voice coil wire 22 wound outside the bobbin 21, and the first connecting portion 11 may be connected to the bobbin 21 or connected to the voice coil wire 22. The second connecting portion 12 of the elastic member 10 is connected with the housing, thereby realizing the assembly among the voice coil 20, the elastic member 10 and the housing. In another embodiment, the first connecting portion 11 is connected with the cup 80, and the second connecting portion 12 is connected with the housing. In other embodiments, the first connecting portion 11 is connected with the cup 80, and the second connecting portion 12 is connected with the magnetic yoke, or, the first connecting portion 11 is connected with the voice coil 20, and the second connecting portion 12 is connected with the magnetic yoke.

Specifically, as illustrated in FIG. 10, in an embodiment, the application device 100 includes a vibration unit 40, a magnetic circuit system 50, and a housing for installing and fixing the vibration unit 40 and the magnetic circuit system 50; wherein the vibration unit 40 includes a diaphragm 60 and a voice coil 20 combined under the diaphragm 60; the magnetic circuit system 50 includes an upper magnetic conductive plate, a magnet and a lower magnetic conductive plate, wherein the upper magnetic conductive plate and the lower magnetic conductive plate are magnetic conductor structures for correcting magnetic lines of force generated by the magnet, the magnetic circuit system 50 forms a magnetic gap 51, the voice coil 20 is arranged in the magnetic gap 51 of the magnetic circuit system 50. The lower magnetic conductive plate of the present disclosure may be a U-shaped structure including a bottom wall and a side wall, the magnetic gap 51 is formed between the side wall of the upper magnetic conductive plate, the magnet and the lower magnetic conductive plate, a relatively uniform magnetic field is formed in the magnetic gap 51, and the voice coil 20 is disposed in the magnetic gap 51 with a relatively uniform magnetic field. Generally, the voice coil 20 is formed by winding metal wires. When the voice coil 20 is applied with the electrical signal, it vibrates up and down under the action of the ampere force in the magnetic field. The vibration direction of voice coil 20 is indicated by vertical direction or up-down direction, and the direction perpendicular to the vibration direction of the voice coil 20 is indicated by horizontal direction. Since the diaphragm 60 and the voice coil 20 are fixed and integrated as a whole by bonding or other means, the voice coil 20 will also drive the diaphragm 60 to vibrate when it vibrates up and down according to the electrical signal, thereby producing sound waves.

However, since the magnetic field in the magnetic gap 51 is relatively uniform but not absolutely uniform, the position of the voice coil 20 may change during the vibration of the voice coil 20, and the magnetic lines of force on an upper side of the magnetic gap 51 are arc-shaped lines, thus the ampere force received by the voice coil 20 is not only in the vertical direction but also includes the ampere force in other directions, which makes the voice coil 20 easy to occurring polarization in a non-vertical direction during vibration, and further affects the vibration of the diaphragm 60.

In order to prevent the above-mentioned polarization, the elastic member 10 connecting the voice coil 20 and the bracket 70 is provided to perform centering support to the polarization of the voice coil 20, that is, to ensure that the voice coil 20 vibrates in the vibration direction within the magnetic gap 51. In an embodiment, the elastic member 10 is a centering supporting sheet or a flat spring.

In an embodiment, the vibration unit 40 further includes a cup 80 disposed under the diaphragm 60, the cup 80 and the voice coil 20 are arranged at the same side of the diaphragm 60, and when the magnetic gap 51 is provided, the cup 80 is located outside the magnetic gap 51, and the elastic member 10 connecting the cup 80 and the bracket 70 may be provided to perform centering support to the polarization of the voice coil 20, that is, to ensure that the voice coil 20 vibrates in the vibration direction within the magnetic gap 51.

In an embodiment, the bracket 70 is a housing or a magnetic yoke. Since the housing may be used to carry the loudspeaker unit, the bracket 70 is provided as a housing, it can facilitate the fixation of the side of the elastic member 10 away from the vibration unit 40 and improve the centering support effect of the elastic member 10. Since most part of the vibration unit 40 is close to the magnetic gap 51, it is close to the magnetic yoke, and by connecting the side of the elastic member 10 away from the vibration unit 40 to the magnetic yoke, the setting distance of the elastic member 10 can be saved and the centering support effect of the elastic member 10 can be improved. It should be noted that, as described above, the fixing methods of the elastic member 10 in the embodiment include various combinations: the first connecting portion 11 and the second connecting portion 12 of the elastic member 10 being respectively connected to the voice coil 20 and the housing, or the first connecting portion 11 and the second connecting portion 12 of the elastic member 10 being respectively connected to the voice coil 20 and the magnetic yoke, or the first connecting portion 11 and the second connecting portion 12 of the elastic member 10 being respectively connected to the cup 80 and the magnetic yoke, all of which can ensure the centering support effect of the elastic member 10.

Figure 6:
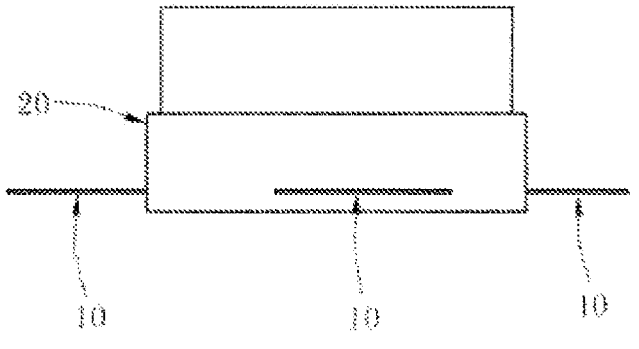
FIG. 6 is a schematic front view of the voice coil and the elastic member in the application device according to an embodiment of the present disclosure.
Figure 7:
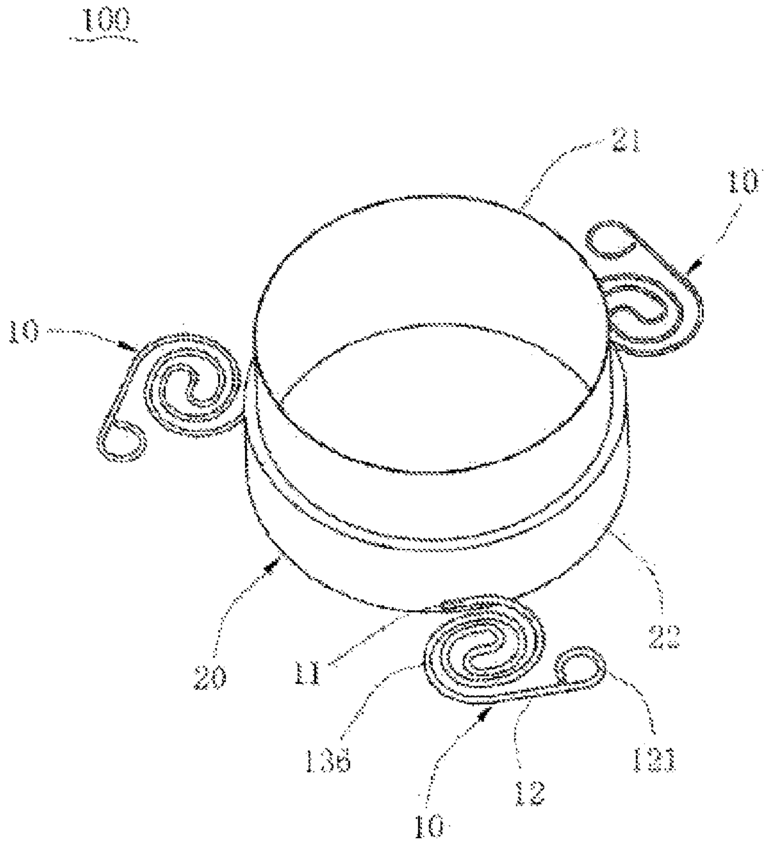
FIG. 7 is a schematic perspective view of a voice coil and an elastic member in the application device according to another embodiment of the present disclosure.
Figure 8:
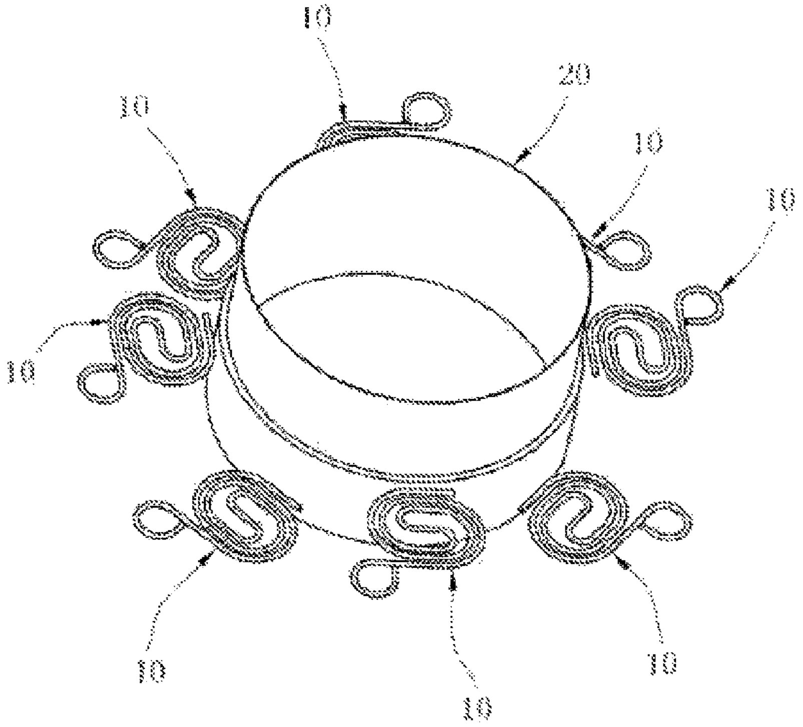
FIG. 8 is a schematic perspective view of a voice coil and an elastic member in an application device according to still another embodiment of the present disclosure.
Figure 9:
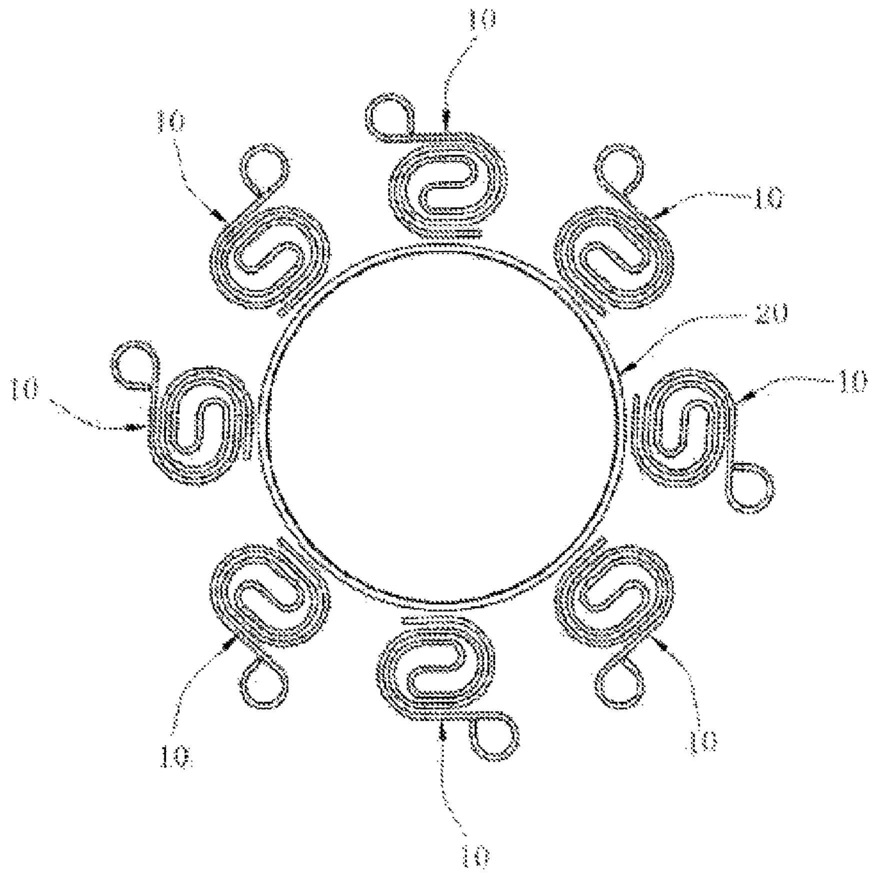
FIG. 9 is a schematic top view of the voice coil and the elastic member in the application device according to the still another embodiment of the present disclosure.

It will be understood that after being applied with the electrical signal, the vibration unit 40 may vibrate in an up-down direction (as shown in FIG. 6) in the housing. The vibration direction of the vibration unit 40 is indicated by vertical direction or up-down direction, and the direction perpendicular to the vibration direction of the vibration unit 40 is indicated by horizontal direction. As illustrated in FIGS. 4, 7 and 9, in an embodiment, the first connecting portion 11 of the elastic member 10 is connected to the voice coil 20, and specifically, the voice coil 20 comprises a bobbin 21 and a voice coil wire 22 around the bobbin 21, the first connecting portion 11 may be connected to the bobbin 21, or may be connected to the voice coil wire 22. The second connecting portion 12 of the elastic member 10 is connected to the housing, thereby realizing the assembly among the voice coil 20, the elastic member 10 and the housing. As illustrated in FIG. 9, in another embodiment, the first connecting portion 11 is connected to the cup 80, and the second connecting portion 12 is connected to the housing. In other embodiments, the first connecting portion 11 is connected to the cup 80, and the second connecting portion 12 is connected to the magnetic yoke, or, the first connecting portion 11 is connected to the voice coil 20 and the second connecting portion 12 is connected to the magnetic yoke.

In the application device 100 of the embodiment, the elastic member group 30 is provided and the elastic member group 30 includes a plurality of elastic members 10, and in an embodiment, the elastic member group 30 includes at least three elastic members 10, and the at least three elastic members 10 are arranged at intervals along the periphery of the vibration unit 40, which enhances the centering effect on the vibration unit 40. In a preferred embodiment, the at least three elastic members 10 are arranged at intervals uniformly along the periphery of the vibration unit 40, which further enhances the centering effect on the vibration unit 40. Specifically, when the vibration unit 40 vibrates vertically, the at least three elastic members 10 form at least three constraints on the vibration unit 40 in the horizontal direction, which can prevent the vibration unit 40 from being polarized, and the elastic members 10 move in the vertical direction following the vibration unit 40, enhancing the centering effect on the vibration unit 40. Compared with the existing elastic members 10 in a sheet-shaped elastic wave shape, the elastic member 10 in the present embodiment may have a wire-like, narrow strip-like or sheet-like structure formed by integral punching from a metal sheet, may have a wire-like structure formed by winding a single metal wire, or may have a wire-like structure formed by winding two metal wires, thus it is simple and convenient in manufacture, have a simplified manufacturing process, have high manufacturing efficiency and reduced manufacturing cost. In addition, the elastic members 10 in the present embodiment may not increase the height of the application device 100 in the vertical direction, takes up less space and is convenient to the thinning of the product. In addition, the deformation portion 13 in the elastic member 10 extends in a straight line and/or a curve in the same direction or different directions with a narrow and long structure, which can reduce the stress concentration of the deformation portion 13, increase the fatigue strength, and reduce the risk of fracture of the elastic member 10, so that during the vertical displacement of the elastic members 10 following the vibration unit 40, the elastic deformation of the deformation portion 13 is large enough, such that even when the vibration unit 40 has a large vibration displacement, the compliance of the elastic members 10 maintain good, thereby providing sufficient displacement without affecting the vibration of the vibration unit 40, and optimizing the product performance.

Meanwhile, in the elastic member group 30, the cross-sectional size of at least one elastic member 10 is larger than those of other elastic members 10, that is, at least one elastic member 10 is widened so that the cross-sectional size thereof is larger than those of other elastic members 10, thereby reducing the stress concentration on the elastic members 10, avoiding breakage, ensuring the normal use of the elastic member 10 and thus ensuring the normal use of the application device 100. In addition, at least one elastic member 10 of the elastic member group 30 is widened so that the overall vibration frequency of the elastic members 10 can be changed so as to eliminate resonance and optimize product performance And/or, in the elastic member group 30, at least one elastic member 10 has two cross-sections of different sizes, that is, at least one elastic member 10 may be provided with variable diameters, and specifically, in at least one elastic member 10, an area with large stress can be widened locally so that the cross-sectional size of the area with large stress becomes larger, reducing stress concentration in the area, avoiding breakage, and eliminating resonance. In a preferred embodiment, all the elastic members 10 of the elastic member group 30 are widened, so as to ensure the normal use of the entire elastic member group 30 and completely eliminate resonance.

In the present embodiment, in any one of the elastic members 10, areas close to the first connecting portion 11 and the second connecting portion 12 of the deformation portion 13 form two widen areas 131 correspondingly, and an area of the deformation portion 13 between the two widen areas 131 forms a non-widen area 132, and a cross-sectional width of the deformation portion 13 in the widen area 131 is larger than a cross-sectional width of the deformation portion 13 in the non-widen area 132. It will be understood that the areas of the deformation portion 13 close to the first connecting portion 11 and the second connecting portion 12 generate a large displacement, have large elastic deformation and large stress concentration.

In the present embodiment, the areas of the deformation portion 13 close to the first connecting portion 11 and the second connecting portion 12 are respectively provided as the widen area 131, the area of the deformation portion 13 between the two widen areas 131 is provided as the non-widen area 132, and the cross-sectional width of the deformation portion 13 in the widen areas 131 is widened so that the cross-sectional width of the deformation portion 13 in the widen areas 131 is larger than that in the non-widen area 132, thus it is beneficial to reduce stress concentration in the area with large elastic deformation, avoid breakage, and ensure the normal use of the elastic member 10, and accordingly, the overall vibration frequency of the elastic members 10 can be changed so as to eliminate resonance and optimize product performance. In order to facilitate the fabrication, the elastic member 10 locally widened may be an integrated punching structure. On the one hand, the elastic member 10 formed by integral punching is easy to be locally widened and on the other hand, the flatness and size tolerance of the elastic member 10 by integral punching are easier to control, and the product yield is high.

In the present embodiment, in each of the elastic members 10, the deformation portion 13 has a planar structure, and the deformation portion 13, the first connecting portion 11 and the second connecting portion 12 are located in the same horizontal plane, so that the elastic member 10 as a whole has a planar structure. Compared with the existing elastic members 10 in a sheet-shaped elastic wave shape, the embodiment improves the overall flatness of the elastic member 10, further reduces the height of the application device 100 in the vertical direction, and realizes the design concept of thin products.

Further, all the elastic members 10 of each elastic member group 30 are located in the same horizontal plane, that is, at least three elastic members 10 of an elastic member group 30 are located in the same horizontal plane, which not only enhances the centering effect on the voice coil 20, but also has good symmetry of mechanical stiffness Kms and flatness, meeting the requirements for large displacement fatigue.

In the present embodiment, the elastic member 10 has a wire-like bending structure, which is easy to manufacture and can provide good compliance when the vibration displacement of the voice coil 20 is large. The cross section of the elastic member 10 in the embodiment has a shape such as a square or a rectangle, or may have other flat shapes.

Figure 2:
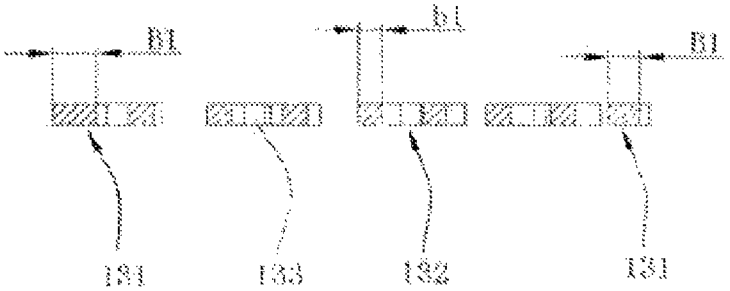
FIG. 2 is a schematic cross-sectional view of the elastic member of the application device according to the embodiment of the present disclosure.

As illustrated in FIGS. 1-2, in an embodiment, the deformation portion 13 has an S-shaped bending structure formed by extending from the first end to the second end in a curve. Specifically, the first end of the deformation portion 13 is connected to the first connecting portion 11, the second end of the deformation portion 13 is connected to the second connecting portion 12, the deformation portion 13 is formed by bending and extending in an S shape from the first end to the second end, and the direction of bending and extending in the S shape is consistent with the direction from the first connecting portion 11 to the second connecting portion 12. The elastic member 10 is bent in an S shape as a whole, and the elastic member 10 bent in the S shape has a large elastic deformation, and thus can provide good compliance when the vibration displacement of the vibration unit 40 is large. The shape of the elastic member 10 of the present disclosure can be flexibly provided according to actual situations, and in other embodiments, the elastic member 10 may be bent in a spiral shape, a serpentine shape or other shapes.

In an embodiment, the width of the deformation portion 13 gradually increases in a direction from the first connecting portion 11 to the second connecting portion 12, and extension lines of the two sides of the deformation portion 13 in a width direction intersect at a point in a direction in which the first connecting portion 11 is far away from the second connecting portion 12 to form an acute angle $\alpha$, wherein the angle value of the acute angle $\alpha$ has obvious influence on the mechanical stiffness of the elastic member 10. When other parameters are identical, the larger the angle value of the acute angle $\alpha$, the lower the value of the mechanical stiffness Kms, and the larger the elastic change amount when the elastic deformation of the deformation portion 13 of the elastic member 10 occurs, the better the linear performance of the elastic member 10. In a preferred embodiment, the acute angle $\alpha$ is not less than 10°.

In another embodiment, the width of the deformation portion 13 gradually decreases in the direction from the first connecting portion 11 to the second connecting portion 12, and extension lines of the two sides of the deformation portion 13 in the width direction intersect at a point in a direction in which the second connecting portion 12 is far away from the first connecting portion 11 to form an acute angle $\alpha$. This embodiment flexibly adjusts the structure of the deformation portion 13 according to the actual situation of the application device 100, and this embodiment has the same effect as the above-mentioned embodiment, which will not be repeated here. For the same reasons as the above-mentioned embodiment, the acute angle $\alpha$ is not less than 10°.

In the present embodiment, a bending line segment 133 is formed by bending the deformation portion 13 once, and the ends of two adjacent bending line segments 133 are connected by a circular arc segment 134, and the line widths of the circular arc segment 134 and the two bending line segments 133 connected thereto are equal or change gradually. The circular arc segment 134 may play a transitional role for avoiding large stress concentration caused by direct bending between two adjacent bending segments. In an embodiment, the line widths of the circular arc segment 134 and the two bending line segments 133 connected thereto are equal to each other, which is convenient for manufacture. In another embodiment, the line widths of the circular arc segment 134 and the two bending line segments 133 connected thereto change gradually, so that the line width of the circular arc segment 134 can be flexibly adjusted according to the stress concentration situation so as to reduce the stress concentration.

In the present embodiment, the line widths of the first connecting portion 11, the second connecting portion 12, and the bending line segment 133 and the circular arc segment 134 close to the first connecting portion 11 and the second connecting portion 12 are larger than those of remaining bending line segments and the circular arc segments 134. Thus, by locally widen areas of the first connecting portion 11, the second connecting portion 12, and the bending line segment 133 and the circular arc segment 134 close to the first connecting portion 11 and the second connecting portion 12 with large elastic deformations, the stress concentration on the elastic member 10 can be further reduced, and the overall vibration frequency of the elastic member 10 can be changed, and as a result, resonance can be eliminated and the product performance can be optimized. In an embodiment, the line widths of the first connecting portion 11, the second connecting portion 12, and the bending line segments 133 and the circular arc segment 134 in the widen area 131 are set as B1, the line widths of the bending line segments 133 and the circular arc segment 134 in the non-widen area 132 are set as b1, $b1<B1<8b1$.

In the present embodiment, a gap between the first connecting portion 11 and the bending line segment 133 adjacent thereto, a gap between two adjacent bending line segments 133, a gap between the second connecting portion 12 and the bending line segment 133 adjacent thereto, and the diameter of the circular arc segment 134 are greater than or equal to the thickness of the elastic member 10, so as to be manufactured by punching. In the present embodiment, the thickness of the elastic member 10 may be 0.1 mm-0.5 mm, and the above-mentioned gaps and the diameter of the circular arc segment 134 may be 1.5 times the thickness of the elastic member 10.

In the present embodiment, an opening 135 is formed at the position between two adjacent bending line segments 133 relative to the circular arc segment 134, the opening 135 located in the non-widen area 132 is provided with a damping member 14, and the damping member 14 connects two adjacent bending line segments 133. The material of the damping member 14 includes at least one of metal material, rubber material, silicone material, glue material and foam material; and/or, the damping member 14 is provided in the form of a sheet-like structure or a wire-like structure, only satisfying two adjacent bending line segments 133 to be connected.

In an embodiment, the damping member 14 is damping adhesive, the elastic member 10 is locally coated or injected with the damping adhesive in the non-widen area 132, the damping adhesive is provided at the opening 135, and connects the two adjacent bending line segments 133. The damping adhesive may improve the resonance frequency of the elastic member 10, eliminates resonance, and further optimizes the product performance.

As illustrated in FIGS. 3-9, in another embodiment, a central area 137 is positioned between the first end and the second end of the deformation portion 13; the deformation portion 13 is formed by extending from the first end to the central area 137 in a straight line and/or a curve in a first direction, then extending from the central area 137 to the second end in a straight line and/or a curve in a direction opposite to the first direction. Specifically, the deformation portion 13 has a helical structure, and the deformation portion 13 is formed by spirally extending from the first end to the central area 137 in a clockwise direction or counter-clockwise direction, then spirally extending from the central area 137 to the second end in the counterclockwise direction or the clockwise direction, so that the deformation portion 13 has a helical structure that spirally extends in two opposite directions respectively, has a large elastic deformation, and can provide good compliance when the vibration displacement of the vibration unit 40 is large. The first connecting portion 11 and the second connecting portion 12 are located on both sides of the deformation portion 13 respectively, and the first end and the second end of the deformation portion 13 may be connected to the first connecting portion 11 and the second connecting portion 12 or the second connecting portion 12 and the first connecting portion 11, respectively. That is, the first end of the deformation portion 13 is connected to the first connecting portion 11, the second end of the deformation portion 13 is connected to the second connecting portion 12, or, the first end of the deformation portion 13 is connected to the second connecting portion 12, the second end of the deformation portion 13 is connected to the first connecting portion 11. Further, the deforming portion 13 has a centrosymmetric structure around its center point, so that on the one hand, it is convenient for fabrication, on the other hand, the first end and the second end of the deformation portion 13 may be interchanged, which is convenient for use.

In another embodiment, the deformable portion 13 has a square helical-like structure, and the deformation portion 13 is formed by extending from the first end to the central area 137 along a straight line and a curve respectively, then extending from the central area 137 to the second end along a curve and a straight line respectively, so that the deformation portion 13 has a helical-like structure that extends in two opposite directions respectively along a straight line and a curve, has a large elastic deformation, and can provide good compliance when the vibration displacement of the vibration unit 40 is large. The first connecting portion 11 and the second connecting portion 12 are located on both sides of the deformation portion 13 respectively, and the first end and the second end of the deformation portion 13 may be connected to the first connecting portion 11 and the second connecting portion 12 or the second connecting portion 12 and the first connecting portion 11, respectively. That is, the first end of the deformation portion 13 is connected to the first connecting portion 11, the second end of the deformation portion 13 is connected to the second connecting portion 12, or, the first end of the deformation portion 13 is connected to the second connecting portion 12, the second end of the deformation portion 13 is connected to the first connecting portion 11. In the present disclosure, the deformation portion 13 can be provided as a helical structure or a square helical-like structure according to actual situations, which is simple and convenient.

In the present embodiment, a spiral line segment 136 is formed by bending the deformation portion 13 once, and two adjacent spiral line segments 136 are arranged with an intervals, so as to provide sufficient elastic deformation. Further, the interval between any two adjacent spiral line segments 136 is at least larger than the cross-sectional width of the spiral line segment 136, which further improves the degree of elastic deformation of the deformation portion 13. In addition, the deformation portion 13 having a helical structure, on one hand, can reduce the stress concentration of the deformation portion 13, increase the fatigue strength, and reduce the risk of fracture of the elastic member 10, and on the other hand, can provide enough processing space to prevent the tool from scratching the wire during processing, so as to ensure that the performance of the elastic member 10 is not affected.

A spiral line segment 136 is formed by bending the deformation portion 13 once, and two adjacent spiral line segments 136 are arranged with an interval, so as to provide sufficient elastic deformation. Further, the interval between any two adjacent spiral line segments 136 is at least larger than the cross-sectional width of the spiral line segment 136, which further improves the degree of elastic deformation of the deformation portion 13. In order to further reduce the stress concentration in the area with large elastic deformation, the line width of the spiral line segment 136 may change gradually. For example, an area with large elastic deformations can be widened, and specifically, the line widths of the first connecting portion 11, the second connecting portion 12, and the spiral line segments 136 close to the first connecting portion 11 and the second connecting portion 12 are larger than the line widths of the remaining spiral line segments 136. By locally widen areas of the elastic member 10 with large elastic deformation, the overall vibration frequency of the elastic member 10 can be changed, and as a result, resonance can be eliminated and the product performance can be optimized. In the present embodiment, the line widths of the first connecting portion 11, the second connecting portion 12, and the spiral line segments 136 close to the first connecting portion 11 and the second connecting portion 12 are set as B2, the line widths of the remaining spiral line segments 136 are set as b2, $b2<B2<8b2$.

Further, a gap between the first connecting portion 11 and the spiral line segment 136 adjacent thereto, a gap between two adjacent spiral line segments 136, and a gap between the second connecting portion 12 and the spiral line segment 136 adjacent thereto are greater than or equal to the thickness of the elastic member 10, so as to be manufactured by punching. In the present embodiment, the thickness of the elastic member 10 may be 0.1 mm-0.5 mm, and the above-mentioned gaps may be 1.5 times the thickness of the elastic member 10.

Each of a gap between a spiral line segment 136 connected to the first connecting portion 11 and an adjacent spiral line segment 136, and a gap between a spiral line segment 136 connected to the second connecting portion 12 and an adjacent spiral line segment 136 is provided with a damping members 14 to connect two adjacent spiral line segments 136. The material of the damping member 14 includes at least one of metal material, rubber material, silicone material, glue material and foam material; and/or, the damping member 14 is provided in the form of a sheet-like structure or a wire-like structure, only satisfying two adjacent spiral line segments 136 to be connected.

In an embodiment, the damping member 14 is damping adhesive, the spiral line segment 136 connected to the first connecting portion 11 has a large amplitude, so that the gap between the spiral line segment 136 and the adjacent spiral line segment 136 is locally coated or injected with the damping adhesive, the damping adhesive connects the two adjacent spiral line segments 136, improves the resonance frequency of the elastic member 10, eliminates resonance, and further optimizes the product performance. Likewise, the spiral line segment 136 connected to the second connecting portion 12 has a large amplitude, so that the gap between the spiral line segment 136 and the adjacent spiral line segment 136 is locally coated or injected with the damping adhesive, the damping adhesive connects the two adjacent spiral line segments 136, improves the resonance frequency of the elastic member 10, eliminates resonance, and further optimizes the product performance.

Existing damper materials are easily affected by environmental changes, are easily deformed in a high temperature and high humidity environment, their hardness changes, and their fatigue resistance is relatively poor. The elastic member 10 according to the present disclosure is made of at least one of phosphor bronze, iron, steel or alloy materials, which are not susceptible to environmental changes, not easy to deform under high temperature and high humidity environment, and the hardness may not be changed, they have good fatigue resistance, so that the application device 100 can work in harsh environments, therefore, the product performance can be optimized and the application universality of the application device 100 can be improved. In order to facilitate the connection, on each elastic member 10, an end of the second connecting portion 12 away from the deformation portion 13 forms a hook portion 121, and the hook portion 121 is connected with the housing. Specifically, the hook portion 121 is connected to a hanging column of the housing.

The application device 100 may be a loudspeaker, a motor, or a multifunctional vibration device, and has a wide range of applications. The present disclosure is described by taking the application device 100 as a loudspeaker as an example. The application device 100 includes a vibration unit 40 and the above-mentioned elastic members 10, the elastic members 10 are used to balance the vibration of the vibration unit 40 in a preset direction. One or more vibration units 40 may be provided, and the vibration units 40 may be arranged in a vertical direction or a horizontal direction. The application device 100 further includes a bracket 70, and in an embodiment, the vibration unit 40 includes a diaphragm 60 and a voice coil 20 connected to the diaphragm 60; the first connecting portion 11 is connected to the voice coil 20, and the second connecting portion 12 is connected to the bracket 70, and/or, the bracket 70 is a housing or a magnetic yoke. In another embodiment, the vibration unit 40 includes a diaphragm 60, a voice coil 20 and a cup 80, the voice coil 20 and the cup 80 are connected at the same side of the diaphragm 60, the first connecting portion 11 is connected to the cup 80, and the second connecting portion 12 is connected to the bracket 70, and/or, the bracket 70 is a housing or a magnetic yoke. The specific structure of the elastic member 10 in the application device 100 refers to the above-mentioned embodiments. Since the application device 100 adopts all the technical solutions in the above-mentioned embodiments, it at least has all the beneficial effects brought by the technical solutions of the above embodiments, which will not be repeated here.

In the application device 100 of the embodiment, the number of the elastic members 10 is at least three, and the at least three elastic members 10 are uniformly spaced apart along a periphery of the vibration unit 40. In an embodiment, the number of the elastic members 10 is three, and the three elastic members 10 are uniformly spaced apart along the periphery of the vibration unit 40, so that the centering effect on the vibration unit 40 is enhanced. In other embodiments, the number of the elastic members 10 may be four, five, six or other numbers. The number of the elastic members 10 in the application device 100 can be flexibly adjusted according to actual situations, and the number of the elastic members 10 is not limited in the present disclosure.

The application device 100 may include at least one elastic member group 30, and one elastic member group 30 includes at least three elastic members 10 located on the same horizontal plane. In the same elastic member group 30, the shapes of the three elastic members 10 may be the same or different. For example, among the three elastic members 10 in the same elastic member group 30, one of the elastic members 10 may be bent in an S shape, and other two may be bent in a spiral. In addition, in the same elastic member group 30, the line widths or materials of the three elastic members 10 may be the same or different. For example, due to the difference in material properties, one of the three elastic members 10 is made of phosphor bronze and has a line width of 0.4 mm, another elastic member 10 is made of beryllium copper and has a line width of 0.3 mm, and the other one is made of 316 steel and has a line width of 0.2 mm. In the same elastic member group 30, the three elastic members 10 may be manufactured in the same method or in different methods. For example, one of the three elastic members 10 may be formed by integral punching, and other two may be formed by winding a single metal wire or two metal wires.

In addition, among the three elastic members 10 of the same elastic member group 30, two of the elastic members 10 are conductors, and the remaining elastic member 10 is a non-conductor. The elastic member 10 of the conductor structure has a conductive function and can transmit an electrical signal to the vibration unit 40 of the application device 100. Specifically, the elastic member 10 is electrically connected with a wiring part of the vibration unit 40 through the first connecting portion 11, and the second connecting portion 12 is connected with an external power supply, so that the electrical signal between the vibration unit 40 and the outside is transmitted through the elastic member 10. In addition, the elastic member 10 constrains the reciprocating vibration of the vibration unit 40 according to the vibration offset state of the vibration unit 40 through the elastic deformation of its deformation portion 13, so that the vibration unit 40 is stabilized in a preset central area, the polarization of the vibration unit 40 is prevented, and the reciprocating vibration of the vibration unit 40 is more stable. Therefore, the elastic member 10 has both the functions of conducting electricity and centering, and can realize the integration of the two functions. In the application device 100, the conduction of the internal and external circuits and the centering of the vibration of the vibration unit 40 can be realized at the same time by only providing two elastic members 10 of the present disclosure, as such, a space in the cavity of the application device 100 is saved, the thinning of the product is further facilitated, and the assembly process of the application device 100 is effectively simplified.

The application device 100 may include a plurality of elastic member groups 30, for example, two or three elastic member groups 30. Taking two elastic member groups 30 as an example, the two elastic member groups 30 are spaced apart in the vertical direction of the vibration unit 40, each elastic member group 30 includes four elastic members 10, and the four elastic members 10 are located in the same horizontal plane. The eight elastic members 10 of the two elastic member groups 30 are arranged misaligned in the vertical direction, which not only enhances the centering effect on the vibration unit 40, but also has good symmetry of mechanical stiffness Kms and flatness, meeting the requirements for large displacement fatigue. Compared with the case of one elastic member group 30, the plurality of elastic member groups 30 can enhance the centering effect on the vibration unit 40, and on the other hand reduce the stress concentration, which correspondingly reduce the wire diameter of the elastic member 10 and it is easier to manufacture.

In the application device 100 of the present disclosure, the number and arrangement of the elastic member groups 30, and the shape, structure, line width, material, attribute and manufacturing method of each elastic member group 30 can be flexibly set according to actual needs, has a good compatibility and a wide range of application.

The above only describes the preferred embodiments of the present disclosure, and is not intended to limit the scope of the present disclosure. Any equivalent structural transformation made by using the contents of the description and drawings of the present disclosure within the inventive concept of the present disclosure, or direct/indirect application in other relevant technical fields, is included in the scope of patent protection of the present disclosure.

What is claimed is:

1. An application device comprising a plurality of elastic members, each elastic member comprises a first connecting portion, a second connecting portion and a deformation portion between the first connecting portion and the second connecting portion, wherein the first connecting portion and the second connecting portion are respectively connected to different members in the application device, and the different members are movable relative to each other, or the different members are fixed relative to each other, wherein the deformation portion comprises a first end connected to one of the first connecting portion and the second connecting portion, and a second end connected to the other one of the first connecting portion and the second connecting portion, wherein the deformation portion is formed by extending from the first end to the second end in a curve in the same direction or in different directions, and wherein a cross-sectional size of at least one of the elastic members is larger than a cross-sectional size of remaining elastic member, and/or at least one of the elastic members has at least two cross sections having different sizes.

2. The application device of claim 1, wherein in any one of the elastic members, areas close to the first connecting portion and the second connecting portion of the deformation portion form two widen areas correspondingly, an area of the deformation portion between the two widen areas forms a non-widen area, and a cross-sectional width of the deformation portion in the widen area is larger than a cross-sectional width of the deformation portion in the non-widen area.

3. The application device of claim 1, wherein in each of the elastic members, the deformation portion has a planar structure, and the deformation portion, the first connecting portion and the second connecting portion are located in the same horizontal plane.

4. The application device of claim 3, wherein all of the elastic members in each elastic member group are located in the same horizontal plane.

5. The application device of claim 1, wherein the elastic members have wire-like bending structures.

6. The application device of claim 5, wherein the deformation portion has an S-shaped bending structure formed by extending from the first end to the second end in a straight line.

7. The application device of claim 6, wherein a width of the deformation portion gradually increases in a direction from the first connecting portion to the second connecting portion, and extension lines of two sides of the deformation portion in a width direction intersect at a point in a direction in which the first connecting portion is far away from the second connecting portion, to form an acute angle, or wherein a width of the deformation portion gradually decreases in the direction from the first connecting portion to the second connecting portion, and the extension lines of the two sides of the deformation portion in the width direction intersect at a point in a direction in which the second connecting portion is far away from the first connecting portion, to form an acute angle.

8. The application device of claim 6, wherein a bending line segment is formed by bending the deformation portion once, and ends of two adjacent bending line segments are connected by a circular arc segment, and line widths of the circular arc segment and two bending line segments connected to the circular arc segment are equal to each other or gradually change.

9. The application device of claim 8, wherein line widths of the first connecting portion, the second connecting portion, the bending line segment and the circular arc segments close to the first connecting portion and the second connecting portion are larger than line widths of remaining bending line segments and remaining circular arc segments.

10. The application device of claim 8, wherein a gap between the first connecting portion and a bending line segment adjacent to the first connecting portion, a gap between two adjacent bending line segments, a gap between the second connecting portion and a bending line segment adjacent to the second connecting portion and a diameter of the circular arc segment are greater than or equal to thickness of the elastic members.

11. The application device of claim 8, wherein an opening is formed at a position between two adjacent bending line segments opposite to the circular arc segment, the opening located in the non-widen area is provided with a damping member, and the damping member connects two adjacent bending line segments.

12. The application device of claim 5, wherein a central area is positioned between the first end and the second end; the deformation portion is formed by extending from the first end to the central area in a curve in a first direction, then extending from the central area to the second end in a curve in a direction opposite to the first direction.

13. The application device of claim 12, wherein the deformation portion has a helical structure, and the deformation portion is formed by spirally extending from the first end to the central area in a clockwise direction or a counterclockwise direction, and spirally extending from the central area to the second end in the counterclockwise direction or the clockwise direction.

14. The application device of claim 13, wherein a spiral line segment is formed by bending the deformation portion once, and two adjacent spiral line segments are arranged with an interval.

15. The application device of claim 14, wherein line widths of the first connecting portion, the second connecting portion, and the spiral line segments close to the first connecting portion and the second connecting portion are larger than line widths of remaining spiral line segments.

16. The application device of claim 14, wherein a gap between the first connecting portion and a spiral line segment adjacent to the first connecting portion, a gap between two adjacent spiral line segments and a gap between the second connecting portion and a spiral line segment adjacent to the second connecting portion are greater than or equal to thickness of the elastic members.

17. The application device of claim 16, wherein each of a gap between a spiral line segment connected to the first connecting portion and a spiral line segment adjacent thereto, and a gap between a spiral line segment connected to the second connecting portion and a spiral line segment adjacent thereto is provided with a damping member to connect two adjacent spiral line segments.

18. The application device of claim 1, wherein the application device further comprises a vibration unit, and the elastic members are used to balance vibration of the vibration unit in a preset direction.

19. The application device of claim 18, wherein at least three elastic members are provided, and the at least three elastic members are uniformly spaced apart along a periphery of the vibration unit.

20. The application device of claim 18, wherein the application device further comprises a bracket, the vibration unit comprises a diaphragm and a voice coil connected to the diaphragm; the first connecting portion is connected to the voice coil, and the second connecting portion is connected to the bracket, or wherein the vibration unit comprises a diaphragm, a voice coil and a cup, the voice coil and the cup are connected at the same side of the diaphragm, the first connecting portion is connected to the cup, and the second connecting portion is connected to the bracket, and/or, wherein the bracket is a housing or a magnetic yoke.

* * * * *